Dec. 4, 1956 N. PLANK ET AL 2,772,561
APPARATUS FOR CALIBRATING FLOWMETERS
Filed Aug. 18, 1953 2 Sheets-Sheet 1

Inventors: Norris Plank
Sidney S. Smith
By A. H. McCarthy
Their Agent

Inventors: Norris Plank
Sidney S. Smith
By J. H. McCarthy
Their Agent

United States Patent Office 2,772,561
Patented Dec. 4, 1956

2,772,561

APPARATUS FOR CALIBRATING FLOWMETERS

Norris Plank, East Chicago, Ind., and Sydney S. Smith, Scarsdale, N. Y., assignors to Shell Development Company, Emeryville, Calif., a corporation of Delaware Application August 18, 1953, Serial No. 374,945

5 Claims. (Cl. 73—3)

This invention relates to apparatus for testing flowmeters and pertains more particularly to a method and apparatus for testing liquid flowmeters of the interferential, differential, and/or positive-displacement types.

In the past, pipeline flowmeters have been calibrated by diverting the flow from a pipeline through a by-pass conduit containing the flowmeter to be tested, and thence into a large prover tank. Since the API code requires a prover tank to have a capacity of from 1 to 2 minutes of flow at the rating capacity of the flowmeter, most flowmeters heretofore could be calibrated by using a thousand-gallon prover tank. The advent of the large diameter pipelines necessitated the use of large capacity flowmeters which have proved difficult to test. For example, the flowmeters in certain products pipelines now operate at the rate of 3,000 gallons per minute. In order to test these large capacity flowmeters, it is necessary to employ prover tanks having a capacity of from 5,000 to 6,000 gallons. The use of a prover tank of such large capacity increases the cost of the equipment needed to test the flowmeters. Additional difficulties are encountered in testing flowmeters at such high flow rates. For example, on starting and stopping a test at these high flow rates, abnormally large slippage occurs. Also, the high pressure surges introduced into the system during such a test may knock out the automatic control equipment at the pumping stations.

It is therefore a primary object of this invention to provide a novel method and apparatus for testing large capacity flowmeters while they are in place in a pipeline without employing a prover tank or other expensive testing equipment.

Another object of this invention is to provide apparatus for testing high capacity flowmeters which eliminate errors resulting from the evaporation of the test liquid used to test the meters.

It is also an object of this invention to provide apparatus for testing high capacity flowmeters which is not affected by the entrainment of air or other gas in the liquid being tested, or by volumetric changes in the liquid due to temperature variations.

A further object of this invention is to provide apparatus for testing flowmeters which assures that the meter is tested at the internal operating pressure and rate of liquid flow at which it is otherwise normally operated in its pipeline service.

It is also an object of this invention to provide an apparatus for testing high capacity flowmeters which eliminates or reduces the use of volumetric containers, meter provers, stock tanks, storage tanks, gauge tanks, and/or other types of apparatus for the visual or automatic measuring of static liquid volumes.

Another object of this invention is to provide a simple inexpensive and accurate apparatus for testing high capacity flowmeters which requires a minimum of time and labor to effect a suitable test of the meter operating on any type of liquid product that is handled in a pipeline.

These and other objects of this invention will be understood from the following description taken with reference to the attached drawings, wherein.

Figure 1:
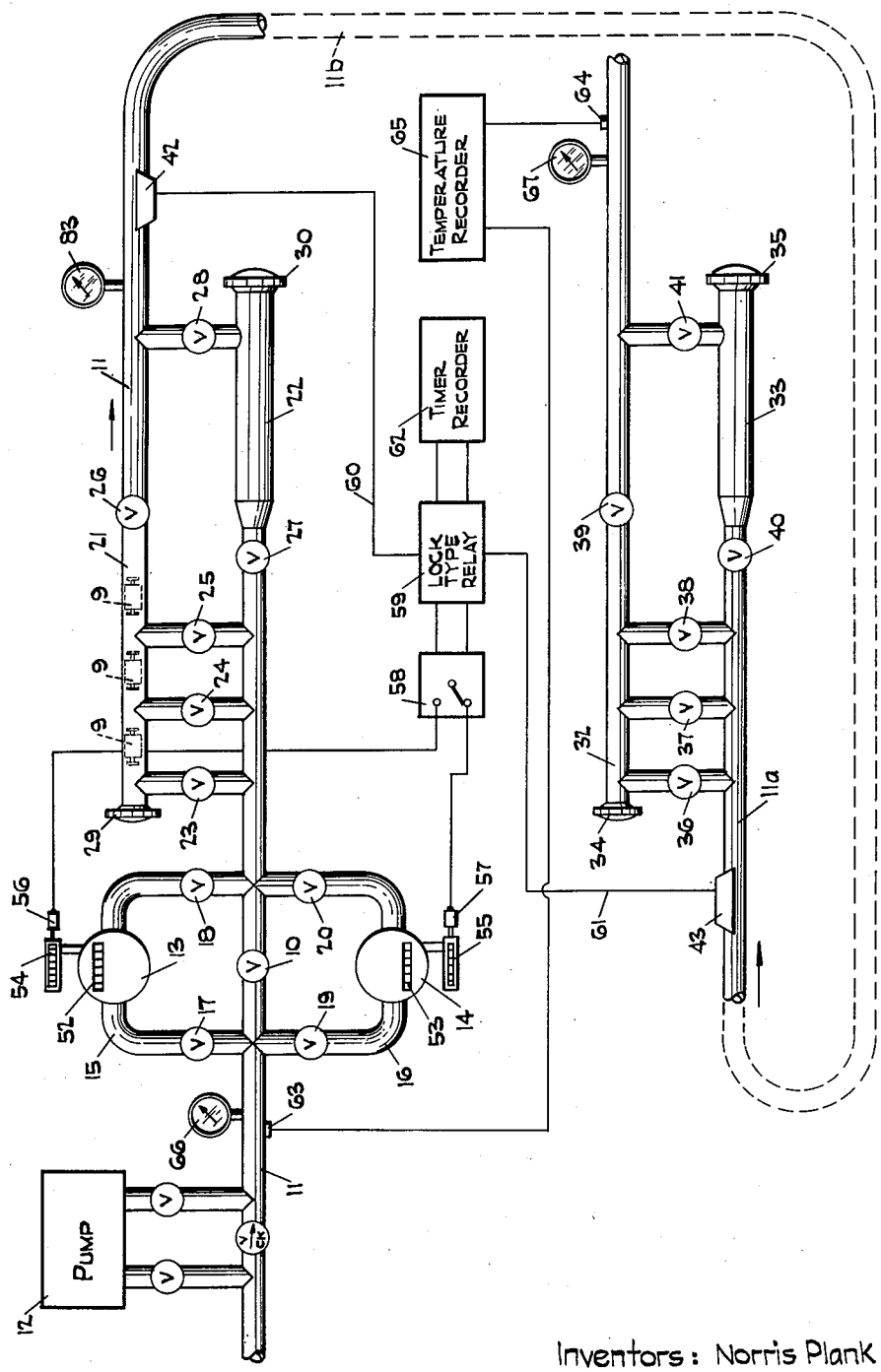
Figure 1 is a schematic view illustrating the metering apparatus of the present invention positioned at spaced locations along a pipeline, together with suitable recording apparatus.

Referring to Figure 1 of the drawing, the auxiliary pipeline equipment employed by the present apparatus is shown as being located at two positions 11 and 11a spaced, for example, a mile apart along a large diameter pipeline 11b, shown in broken lines. A pump 12 is shown positioned in communication with pipeline 11 with one or more flowmeters 13 and 14 located in the pipeline 11 or by-pass lines 15 and 16 thereof. Valves 17, 18, 19 and 20 are provided for closing one by-pass line and isolating the flowmeter therein when the other flowmeter is being tested, while valve 10 is provided for closing the main pipeline adjacent the by-pass lines 15 and 16.

Downstream of the flowmeters 13 and 14 the pipeline 11 is provided with launching and receiving barrels 21 and 22 for inserting a mechanical scraper or plug 9 into the pipeline 11 or removing it therefrom. The scraper launching barrel 21 may be put in communication with the pipeline 11 or isolated therefrom by means of valves 23, 24, 25 and 26. In a like manner, the scraper receiving barrel 22 may be isolated from the pipeline by the closing valves 27 and 28. The launching and receiving barrels 21 and 22 are provided with removable heads 29 and 30, respectively, which may be removed when a mechanical scraper is being inserted into or removed from the pipeline.

At a predetermined distance from the launching and receiving barrels 21 and 22, the pipeline is provided with a second set of launching and receiving barrels 32 and 33. These barrels 32 and 33 are also provided with removable heads 34 and 35 and may be isolated from each other or from the pipeline 11a by closing valves 36, 37, 38, 39, 40 and 41. Scraper launching and receiving barrels 21, 22, 32 and 33 are well known to the art, the receiving barrels often being known as scraper traps. Generally, the scraper launching barrels 21 and 32 are slightly larger in diameter than the pipeline in which they are located. For example, with the pipeline 11 being 14 inches in diameter, the scraper launching barrels 21 and 32 may be 16 inches in diameter. Likewise, the scraper receiving barrels or traps 22 and 33 are of a larger diameter than the pipeline in order to allow the flow of fluid around the scraper after the scraper has been trapped in the barrel 22 or 33. In the 14-inch pipeline 11, the scraper traps 22 and 33 are generally about 20 inches in diameter.

Figure 4:
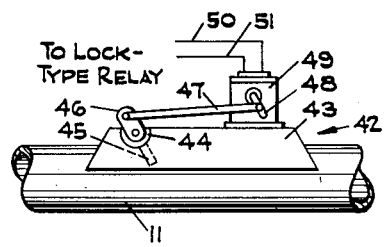
Figure 4 is a signaling device adapted to be actuated by the passage of a mechanical scraper through the pipeline.

Secured to the pipeline downstream of the launching barrel 21 is a scraper arrival signal device 42, which is adapted to be actuated, as will be described hereinbelow, by a scraper as it passes that point in the pipeline 11. A second scraper arrival signal device 43 is affixed to the pipeline 11a upstream of the scraper trap 33 at a measured distance, say, one mile, along the pipeline 11, 11a and 11b from the signal device 42. Any suitable type of scraper signal device 42 and 43 may be employed. The signal devices which indicate the passage or arrival of a pipeline scraper are well known to the art, and they operate on either a mechanical, electrical, pneumatic or magnetic principle. For purposes of illustration, a mechanically actuated scraper arrival signal device 42 is illustrated in Figure 4 of the drawing.

The signal device comprises a housing 43 fixedly secured as by welding to the pipe 11, with the interior of the housing being in open communication with the inside of the pipeline. Pivotally mounted through a fluidtight seal 44 in the housing is a flapper 45, the lower end of which extends into the bore of the pipeline 11. The flapper 45 is connected through linkage members 46, 47 and 48 to actuate a switch, for example, a mercury switch (not shown), which is contained within its housing 49. Electrical leads 50 and 51 connect the signal device to a central control board.

The flowmeters 13 and 14, Figure 1, are provided with registering dials 52 and 53, which record the cumulative total flow of fluid passing through the meters. Geared to the registering dials 52 and 53 of the flowmeters 13 and 14 are auxiliary registering flow indicators 54 and 55, which may be operatively disconnected from the flowmeters by means of spring-loaded solenoid-actuated clutches 56 and 57. The solenoid-actuated clutches 56 and 57 are diagrammatically shown in Figure 1 as being connected to a selector switch 58, whereby either one or the other of the flowmeters 13 and 14 may be connected into the central control board.

The selector switch 58 is in turn connected to a lock-type relay 59 which may be actuated by signals received through leads 60 or 61 from the scraper arrival signal devices 42 and 43. The lock-type relay 59 is electrically connected to start and stop a timer-recorder 62. A suitable temperature indicating device, such, for example, as a resistance thermometer 63, is provided in the pipeline 11 upstream of the meters 13 and 14 or upstream of the scraper arrival signal device 42 for measuring the temperature of the fluid within the pipeline at the beginning of the test run. A second temperature indicating device 64 is provided in the pipeline downstream of the second scraper signal 43 to record the temperature of the fluid at the end of the test run. Both temperature indicating devices may be connected in any suitable manner to a temperature recorder 65 located at a central control board (not shown). Pressure gauges 66 and 67 are supplied at positions adjacent the temperature indicating devices 63 and 64.

Figure 3:
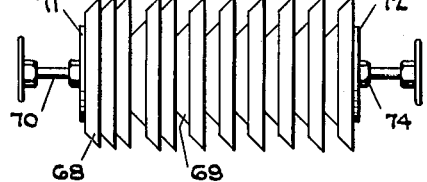
Figure 3 is a view in front elevation of a mechanical pipeline scraper to be used with the present apparatus.

One type of a mechanical scraper, to be used with the meter testing apparatus of this invention, is illustrated in Figure 3 of the drawing. The scraper comprises a plurality of rubber disc-like wiping elements 68 which may be separated by a series of spacers 69 having a smaller diameter. The wipers 68 and the spacers 69 are mounted on a central mandrel or rod 70 and are secured together between end plates 71 and 72 and lock nuts 73 and 74.

Figure 2:
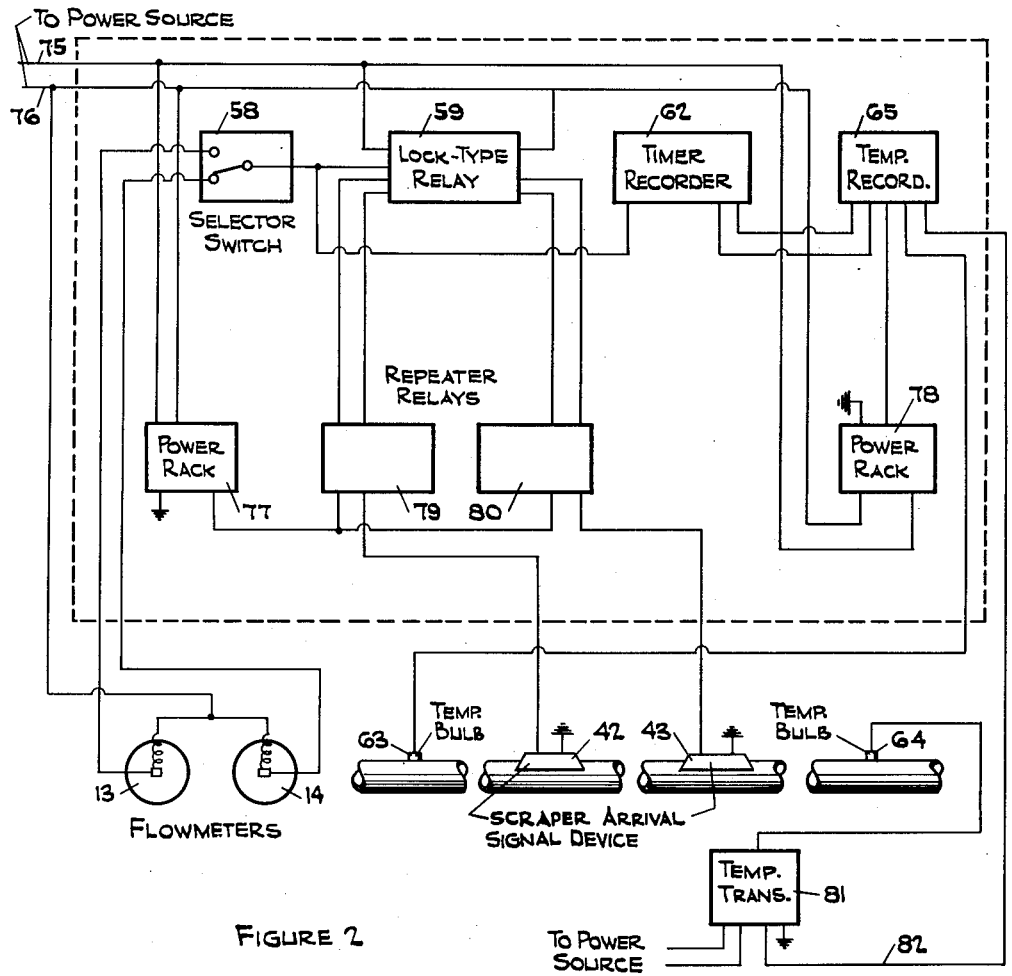
Figure 2 is a diagrammatic sketch illustrating an electric circuit to be used with the present flowmeter testing apparatus.

In Figure 2 of the drawing, the flowmeters 13 and 14, the scraper arrival devices 42 and 43, and the temperature indicating means 63 and 64 are shown as being connected together in a control circuit which is energized from a power source through leads 75 and 76. A pair of rectifiers or power packs 77 and 78 are employed in the circuit to convert the A. C. current to D. C. Additionally, instead of having the scraper signal devices 42 and 43 connected directly to the lock-type relay 59 as shown in Figure 1, the scraper devices 42 and 43 are connected to a pair of repeater relays 79 and 80 which are in turn connected to the lock-type relay 59.

In making a test of flowmeter 14 (Figure 1), valves 19 and 20 in by-pass line 16 are open while valves 17 and 18 in by-pass line 15 are closed, thereby isolating flowmeter 13. Valve 10 is closed. Prior to the insertion of a scraper into the scraper launching barrel 21, the valves 23, 24, 25 and 26 are closed and valves 27 and 28 opened so that the receiving barrel 22 serves as a by-pass conduit to by-pass the fluid around the launching barrel 21. The cover 29 is then removed and one or more mechanical scrapers or plugs 9, such as shown in Figure 3 are inserted into the launching barrel 21. After closing the launching barrel by replacing its cover 29 and filling barrel 21 so that no air is present, selector switch 58 is set to connect electrically the solenoid-operated counter 55 of flowmeter 14 to the lock-type relay 59. Upon the opening of valves 25 and 26 and the closing of valves 27 and 28, a scraper or plug 9 is launched into the liquid effluent and commences its run through the pipeline 11, 11b and 11a. As the mechanical plug is propelled along the pipeline 11 with the liquid stream, it strikes the first mechanically-actuated electric switch 42, causing the switch to close and send an electric impulse through transmission line 60 to the lock-type relay 59. As this relay 59 is locked in, contacts are closed which complete a power circuit to the solenoid-actuated clutch 57 on flowmeter 14.

The engagement of the clutch 57 starts the registration on the indicating portion of the meter register 55, which registration continues so long as the lock-type relay 59 holds the circuit to the solenoid 57 closed. The mechanical plug is propelled inside the pipeline 11 at an average velocity which is equal to the average velocity of the effluent liquid from the meter 14 being tested. The plug continues its course along the pipeline with the meter effluent stream, and at the same time the meter register, which has been set in motion, continues its registration until such a time as the plug intercepts and trips the second mechanically-actuated electric switch 43. The control circuit impulse created by the tripping of switch 43 unlocks the lock-type relay 59 through transmission line 61, thus breaking the power circuit to spring-loaded solenoid clutch 57. Upon the de-energizing of said clutch 57, which drives meter register 55, the meter register is stopped. The mechanical scraper continues to be propelled through valve 40 into the oversized scraper removal barrel 33, whose cross-sectional area is sufficient to permit the liquid to flow around the scraper through valve 41 and continue on in the pipeline to its destination. The scraper may be removed from the barrel 33 by opening valves 38 and 39 and closing valves 40 and 41, thus by-passing the flow of fluid around the scraper removal barrel 33. If desired, additional check runs may be made by other scrapers 9 by opening first valve 24 and then valve 23 (Figure 1) to discharge the scrapers out of the launching barrel 21 and into the pipeline 11b.

On the closing of lock-type relay 59, when the scraper passes the first signal device 42, a power supply circuit is completed to the timer-recorder 62. This power circuit is subsequently broken when the scraper passes the second signal device 43. Thus, the period of time required for the passage of the scraper from signal device 42 to the signal device 43 is timed and recorded by the timer recorder 62. This enables an operator to compute the average rate of flow of liquid which is maintained in the flowmeter effluent conduit during the traverse of the scraper between signal devices 42 and 43.

The difference in readings of the solenoid-actuated flowmeter register 55 taken at the beginning and end of the test run is a measure of the amount of fluid in the pipeline 11 and 11a between the scraper signal devices 42 and 43. This volume figure obtained from the flowmeter register 55 may be compared with the actual volume of the pipeline between the signal devices 42 and 43. The actual volume may be previously or subsequently determined by calculation, volumetric gauging, experimentation, or by inference from the performance of known plugs in the remainder of the effluent pipeline. A comparison between the indicated volume and the known actual volume is an indication of the performance of the flowmeter under conditions existing during the time of the traverse of the mechanical scraper in the pipeline 11.

During the test run, the temperature indicating devices 63 and 64 (Figure 1) transmit the temperature to the temperature recorder 65, which is preferably a two-pen recorder located at a central instrument board. As shown in Figure 2, the temperature indicating device 64, which may be located as far away as one mile from the control board, may transmit the indicated temperature at that point to a temperature transmitter 81 which in turn electrically transmits the temperature by line 82 to the temperature-recorder 65 on the control board. The operating pressure of the flowmeter is indicated by the pressure gauge 66. The pipeline pressures at the beginning and the end of the test runs are indicated on pressure gauges 83 and 67, respectively. If desired, provision may be made for the telemetering of these three pressures in a manner similar to that previously described for the telemetering of the stream temperatures. The pressure readings are used to obtain the average pressure of the flowing fluid between the two mechanically tripped signal indicators 42 and 43 for the purpose of determining the extent to which the liquid is compressed above atmospheric pressure during the period of testing of the flowmeter. The temperature readings obtained by the temperature indicating devices 63 and 64 provide an accurate means for determining the average temperature of the liquid between the two mechanically actuated signal devices 42 and 43 and enable the reduction of the known volume between them to the equivalent volume at some predetermined standard test temperature.

It may be readily seen that by closing valves 19 and 20 and opening valves 17 and 18 with valve 10 still closed (Figure 1) flowmeter 13 is put on line for testing. It is also necessary to move the contact arm of selector switch 58 so that the solenoid actuated clutch 56 of flowmeter 13 could be energized. Thus, it may be seen that the present invention provides means for testing one or more flowmeters under operating conditions. Inner entrainment in the system is prevented by maintaining the liquid passing through the flowmeter in a coninuous liquid phase, under pressure and free of entrained air or vapors.

No limitations are imposed by this invention on the relative linear distance or the volume of liquid included in the pipeline between the two mechanically actuated switches 42 and 43. The distance may be established at the discretion of the operator, but should be of sufficient magnitude to preclude any possibility of error due to lag in the instrumentation. A volume of liquid equivalent to one minute's capacity of the flowmeter being tested has been found to be a satisfactory volume, although lesser or greater amounts may be used. By the present method of testing flowmeters, the degree of accuracy of the flowmeter or flowmeters under test is determined from the ratio between the known volume of the pipeline between the two signal devices 42 and 43, and the volume registered by the meter 55 during the period between the tripping of the electrical switches 42 and 43. Adjustments to the meter accuracy based on adjustment to a common past temperature and/or a common past pressure, are made by observing the various temperatures and pressures involved and correcting the same on the basis of known physical properties such as thermal expansion and compressability of the liquid being metered.

While the present apparatus shown in Figure 1 and the circuit shown in Figure 2 is described with regard to the scraper signal devices 42 and 43 closing switch means to actuate or energize the circuit, it is readily apparent that a similar circuit can be used wherein the apparatus operates in the same manner if the scraper signal devices 42 and 43 were designed to open switch means rather than close switch means. Additionally, it is realized that the registers 52 and 53 on the flowmeters 13 and 14 may be designed to be actuated by solenoid operated clutches 56 and 57, rather than employing auxiliary registers 54 and 55. It is also realized that entire apparatus including barrels 21, 22, 32 and 33 and their valves may be located upstream of flowmeters 13 and 14.

From the above description, it may be seen that an apparatus has been provided whereby high capacity flowmeters may be readily tested at exactly the internal operating pressures and temperatures at which they are normally operated in regular service without employing any expensive testing apparatus. The present apparatus is simple, efficient, and inexpensive and requires a minimum of time and labor in order to effect an accurate test of a flowmeter.

We claim as our invention:

1. Apparatus for calibrating an indicating flowmeter in a pipeline comprising plug means insertable in said pipeline to form a movable seal within said pipeline, said plug means being adapted to be propelled through said pipeline by the flowing fluid at the velocity thereof, first and second signal means mounted in longitudinally spaced relationship at predetermined points in said pipeline, said signal means being adapted to be actuated by the arrival of said plug means thereat, and electrical circuit means connecting said first and second signal means with said flowmeter, whereby said indicating flowmeter is energized by the arrival of said plug means at said first signal means and de-energized by the arrival of said plug means at said second signal means.

2. Apparatus for calibrating an indicating flowmeter in a pipeline comprising a launching barrel in said pipeline, plug means insertable in said pipeline through said launching barrel to form a movable seal within said pipeline, said plug means being adapted to be propelled through said pipeline by the flowing fluid at the velocity thereof, first and second signal means mounted in longitudinally spaced relationship at predetermined points in said pipeline, said signal means being adapted to be actuated by the arrival of said plug means thereat, a receiving barrel in said pipeline downstream of said signal means for removing the plug means from the pipeline, and electrical circuit means connecting said first and second signal means with said flowmeter, whereby said indicating flowmeter is energized by the arrival of said plug means at said first signal means and de-energized by the arrival of said plug means at said second signal means.

3. Apparatus for calibrating an indicating flowmeter in a pipeline comprising a launching barrel in said pipeline, plug means insertable in said pipeline through said launching barrel to form a movable seal within said pipeline, first conduit means for by-passing said launching barrel when the plug means is being inserted therein, said plug means being adapted to be propelled through said pipeline by the flowing fluid at the velocity thereof, first and second signal means mounted in longitudinally spaced relationship at predetermined points in said pipeline, said signal means being adapted to be actuated by the arrival of said plug means thereat, a receiving barrel in said pipeline downstream of said signal means for removing the plug means from the pipeline, second conduit means for by-passing said receiving barrel when said plug means is removed therefrom, valve means in said first and second conduit means adapted to be closed as said plug means traverses the pipeline from said launching barrel to said receiving barrel, and electrical circuit means connecting said first and second signal means with said flowmeter, whereby said indicating flowmeter is energized by the arrival of said plug means at said first signal means and de-energized by the arrival of said plug means at said second signal means.

4. Apparatus for calibrating an indicating flowmeter in a pipeline comprising register means on said flowmeter for indicating the flow therethrough, electrically actuated clutch means mounted adjacent said register means for engaging and disengaging said register means with said flowmeter, launching barrel means in said pipeline, a plug member insertable into said pipeline through said launching barrel to form a movable seal within said pipeline, said plug member being adapted to be propelled through said pipeline by the flowing fluid stream therein at the velocity of the stream, first and second signal means mounted in longitudinal spaced relationship at predetermined points in said pipeline downstream of said launching barrel for actuation by the passage of said plug member, receiving barrel means in said pipeline downstream of said second signal means for removing the plug member from said pipeline, and electrical circuit means connecting said first and second signal means to the register means of said flowmeter, whereby said register means is energized when said plug member passes said first signal means and de-energized when said plug member passes said second signal means.

5. Apparatus for calibrating an indicating flowmeter in a pipeline comprising register means on said flowmeter for indicating the flow therethrough, electrically actuated clutch means mounted adjacent said register means for engaging and disengaging said register means with said flowmeter, launching barrel means in said pipeline downstream of said flowmeter, a plug member insertable into said pipeline through said launching barrel to form a movable seal within said pipeline, a first by-pass conduit for by-passing said launching barrel when the plug member is being inserted thereinto, said plug member being adapted to be propelled through said pipeline by the flowing fluid stream therein at the velocity of the stream, first and second signal means mounted in longitudinal spaced relationship at predetermined points in said pipeline downstream of said launching barrel for actuation by the passage of said plug member, a receiving barrel in said pipeline downstream of said second signal means for removing the plug member from said pipeline, a second by-pass conduit for by-passing said receiving barrel when said plug member is being removed therefrom, valve means in said first and second by-pass conduits adapted to be closed as plug member is propelled through said pipeline, a timer-recorder for measuring the time elapsed for the passage of the plug member between said first and second signal means, and electrical conduit means connecting said first and second signal means to said timer-recorder and the register means of said flowmeter, whereby said timer-recorder and said register means are energized when said plug member passes said first signal means and de-energized when said plug member passes said second signal means.

References Cited in the file of this patent
UNITED STATES PATENTS

| | | |
|---|---|---|
| 455,571 | Menzie | July 7, 1891 |
| 2,353,382 | Barrett | July 11, 1944 |
| 2,501,960 | Olson | Mar. 28, 1950 |
| 2,570,951 | Hugo et al. | Oct. 9, 1951 |
| 2,631,451 | Ford et al. | Mar. 17, 1953 |
| 2,710,537 | Schuler et al. | June 14, 1955 |